United States Patent
Wang et al.

(10) Patent No.: US 7,600,067 B2
(45) Date of Patent: Oct. 6, 2009

(54) METHODS FOR IDENTIFYING BRIDGE DEVICES AND SYSTEMS THEREOF

(75) Inventors: Jar-Haur Wang, Taipei (TW);
Hung-Chou Hsu, Taipei (TW)

(73) Assignee: Via Technologies, Inc., Taipei (TW)

( * ) Notice: Subject to any disclaimer, the term of this patent is extended or adjusted under 35 U.S.C. 154(b) by 136 days.

(21) Appl. No.: 11/608,552

(22) Filed: Dec. 8, 2006

(65) Prior Publication Data

US 2007/0208897 A1    Sep. 6, 2007

(30) Foreign Application Priority Data

Mar. 3, 2006  (TW) .............................. 95107265 A
Mar. 3, 2006  (TW) .............................. 95107277 A

(51) Int. Cl.
*G06F 13/36* (2006.01)

(52) U.S. Cl. .......................................... 710/306; 710/8

(58) Field of Classification Search .................... 710/8, 710/10, 305, 306; 714/718, 741
See application file for complete search history.

(56) References Cited

U.S. PATENT DOCUMENTS

| | | | | |
|---|---|---|---|---|
| 6,199,122 | B1 * | 3/2001 | Kobayashi | 710/36 |
| 6,618,788 | B1 * | 9/2003 | Jacobs | 710/315 |
| 7,010,638 | B2 * | 3/2006 | Deng et al. | 710/306 |
| 7,047,335 | B2 * | 5/2006 | Schauer et al. | 710/105 |
| 7,047,460 | B1 * | 5/2006 | Schofield | 714/718 |
| 7,058,748 | B1 * | 6/2006 | Jacobs et al. | 710/311 |
| 7,159,065 | B1 * | 1/2007 | Marlatt | 710/313 |

* cited by examiner

*Primary Examiner*—Khanh Dang
(74) *Attorney, Agent, or Firm*—Thomas, Kayden, Horstemeyer & Risley

(57) ABSTRACT

Methods for identifying bridge devices and systems thereof. A bridge device receives a standard command. In response to the standard command, output information comprising at least one no-available parameter is generated. The bridge device sets the no-available parameter in the output information as a predetermined value if a command code or at least one no-available in the standard command matches a predefined value. The bridge device is identified by determining whether a value of the no-available parameter in the output information matches a predetermined value corresponding to a supported bridge device.

14 Claims, 19 Drawing Sheets

| Register | 7 | 6 | 5 | 4 | 3 | 2 | 1 | 0 |
|---|---|---|---|---|---|---|---|---|
| Features | | | na | | | | | |
| Sector Count | | | Timer period value | | | | | |
| LBA Low | | | na | | | | | |
| LBA Mid | | | na | | | | | |
| LBA High | | | na | | | | | |
| Device | obs | na | obs | DEV | na | | | |
| Command | | | E3h | | | | | |

FIG. 2A

|   | 31 30 29 28 27 26 25 24 | 23 22 21 20 19 18 17 16 | 15 14 13 12 11 10 9 8 | 7 6 5 4 3 2 1 0 |
|---|---|---|---|---|
| 0 | Features | Command E3h | C R R  Reserved | FIS Type |
| 1 | Device | LBA High | LBA Mid | LBA Low |
| 2 | Features (exp) | LBA High(exp) | LBA Mid(exp) | LBA Low(exp) |
| 3 | Control | Reserved | Sector Count(exp) | Sector Count Timer period value |
| 4 | Reserved | Reserved | Reserved | Reserved |

FIG. 2B

| Register | 7 | 6 | 5 | 4 | 3 | 2 | 1 | 0 |
|---|---|---|---|---|---|---|---|---|
| Error | | | | na | | | | |
| Sector Count | | | | na | | | | |
| LBA Low | | | | na | | | | |
| LBA Mid | | | | na | | | | |
| LBA High | | | | na | | | | |
| Device | obs | na | obs | DEV | | na | | |
| Status | BSY | DRDY | DF | na | DRQ | na | na | ERR |

FIG. 3A

| | 31 30 29 28 27 26 25 24 | 23 22 21 20 19 18 17 16 | 15 | 14 | 13 | 12 11 10 9 8 | 7 6 5 4 3 2 1 0 |
|---|---|---|---|---|---|---|---|
| | | | R | I | R | Reserved | FIS Type |
| 0 | Error | Status | | | | | |
| 1 | Device | LBA High | | | | LBA Mid | LBA Low |
| 2 | Reserved | LBA High(exp) | | | | LBA Mid(exp) | LBA Low(exp) |
| 3 | Reserved | Reserved | | | | Sector Count(exp) | Sector Count |
| 4 | Reserved | Reserved | | | | Reserved | Reserved |

FIG. 3B

| Register | 7 | 6 | 5 | 4 | 3 | 2 | 1 | 0 |
|---|---|---|---|---|---|---|---|---|
| Features | na ||||||||
| Sector Count | Timer period value ||||||||
| LBA Low | na ||||||||
| LBA Mid | na ||||||||
| LBA High | 06h ||||||||
| Device | obs | na | obs | DEV | na ||||
| Command | E3h ||||||||

FIG. 4A

|   | 31 30 29 28 27 26 25 24 | 23 22 21 20 19 18 17 16 | 15 14 13 12 11 10 9 8 | 7 6 5 4 3 2 1 0 |
|---|---|---|---|---|
| 0 | Features | Command E3h | Reserved C R R | FIS Type |
| 1 | Device | LBA High | LBA Mid | LBA Low |
| 2 | Features (exp) | LBA High(exp) 06h | LBA Mid(exp) | LBA Low(exp) |
| 3 | Control | Reserved | Sector Count(exp) | Sector Count Timer period value |
| 4 | Reserved | Reserved | Reserved | Reserved |

FIG. 4B

| Register | 7 | 6 | 5 | 4 | 3 | 2 | 1 | 0 |
|---|---|---|---|---|---|---|---|---|
| Features | na |||||||
| Sector Count | Timer period value |||||||
| LBA Low | 07h |||||||
| LBA Mid | 08h |||||||
| LBA High | 06h |||||||
| Device | obs | na | obs | DEV | na ||||
| Command | E3h |||||||

FIG. 5A

|   | 31 30 29 28 27 26 25 24 | 23 22 21 20 19 18 17 16 | 15 14 13 12 11 10 9 8 | 7 6 5 4 3 2 1 0 |
|---|---|---|---|---|
| 0 | Features | Command E3h | C R R Reserved | FIS Type |
| 1 | Device | LBA High | LBA Mid | LBA Low |
| 2 | Features (exp) | LBA High(exp) 06h | LBA Mid(exp) 08h | LBA Low(exp) 07h |
| 3 | Control | Reserved | Sector Count(exp) | Sector Count Timer period value |
| 4 | Reserved | Reserved | Reserved | Reserved |

FIG. 5B

| Register | 7 | 6 | 5 | 4 | 3 | 2 | 1 | 0 |
|---|---|---|---|---|---|---|---|---|
| Features | na |||||||| 
| Sector Count | Timer period value ||||||||
| LBA Low | 07h ||||||||
| LBA Mid | 08h ||||||||
| LBA High | na ||||||||
| Device | obs | na | obs | DEV | na ||||
| Command | E3h ||||||||

FIG. 6A

|   | 31 30 29 28 27 26 25 24 23 22 21 20 19 18 17 16 | 15 14 13 12 11 10 9 8 | 7 6 5 4 3 2 1 0 |
|---|---|---|---|
| 0 | Features | Command E3h | C R R | Reserved | FIS Type |
| 1 | Device | LBA High | LBA Mid | LBA Low |
| 2 | Features (exp) | LBA High(exp) | LBA Mid(exp) 08h | LBA Low(exp) 07h |
| 3 | Control | Reserved | Sector Count(exp) | Sector Count Timer period value |
| 4 | Reserved | Reserved | Reserved | Reserved |

FIG. 6B

| Register | 7 | 6 | 5 | 4 | 3 | 2 | 1 | 0 |
|---|---|---|---|---|---|---|---|---|
| Error | | | | na | | | | |
| Sector Count | | | | 01h | | | | |
| LBA Low | | | | 02h | | | | |
| LBA Mid | | | | 03h | | | | |
| LBA High | | | | 04h | | | | |
| Device | obs | na | obs | DEV | | na | | |
| Status | BSY | DRDY | DF | na | DRQ | na | na | ERR |

FIG. 7A

| | 31 30 29 28 27 26 25 24 | 23 22 21 20 19 18 17 16 | 15 14 13 12 11 10 9 8 | 7 6 5 4 3 2 1 0 |
|---|---|---|---|---|
| 0 | Error | Status | R I R Reserved | FIS Type |
| 1 | Device | LBA High | LBA Mid | LBA Low |
| 2 | Reserved | LBA High(exp) 04h | LBA Mid(exp) 03h | LBA Low(exp) 02h |
| 3 | Reserved | Reserved | Sector Count(exp) 01h | Sector Count |
| 4 | Reserved | Reserved | Reserved | Reserved |

FIG. 7B

METHODS FOR IDENTIFYING BRIDGE DEVICES AND SYSTEMS THEREOF

BACKGROUND OF THE INVENTION

1. Field of the Invention

The disclosure relates generally to device identification, and, more particularly to methods for identifying bridge devices and systems thereof.

2. Description of the Related Art

Computer systems are coupled with several standard interface devices, such as hard disks, CD-ROM drives, floppy disk drives, and others for storing and managing data, and performing related applications. These standard interface devices couple to the computer systems via standard interfaces, such as ATA (Advanced Technology Attachment), ATAPI (AT Attachment Packet Interface), and SATA (Serial Advanced Technology Attachment) interfaces.

In computer systems, a standard interface device couples to a host controller via a bridge device. When a command for the standard interface to perform an action is generated, the command is transmitted to the bridge device by a software program. The bridge device then transforms the command into a specific format understood by the standard interface device, and transmits the command to the standard interface device. Upon receiving the command, the standard interface device performs the command, generates output information, and returns the output information to the host controller via the bridge device. Similarly, the bridge device must transform the output information into a format understood by the host controller.

Generally, the bridge devices must be tested to ensure corresponding functions, and respective manufacturers develop their software programs for the testing. Currently, two standard commands, "IDENTIFY DEVICE" and "IDENTIFY PACKET DEVICE" are provided to retrieve related information of standard interface devices coupled with the bridge devices, and identify the standard interface devices accordingly. However, no mechanism for identifying bridge devices is provided. In some cases, the software program developed by one manufacturer can be easily misappropriated by other manufacturers without authorization.

BRIEF SUMMARY OF THE INVENTION

Methods for identifying bridge devices and systems thereof are provided.

In an embodiment of a method for identifying bridge devices, a bridge device receives a standard command comprising a command code. In response to the standard command, output information comprising at least one no-available parameter is generated. The bridge device sets the no-available parameter as a predetermined value if the command code matches a predefined value. The bridge device is identified according to the output information.

An embodiment of a system for identifying bridge devices comprises a bridge device. The bridge device comprises output information corresponding to a standard command comprising a command code. The output information comprises at least one no-available parameter. The bridge device sets the no-available parameters as a predetermined value if the command code matches a predefined value. The bridge device is identified according to the output information.

An embodiment of a system for identifying bridge devices comprises an application. The application generates and transmits a standard command to a bridge device, and receives output information corresponding to the standard command from the bridge device. The application identifies the bridge device by determining whether a value of at least one no-available parameter in the output information matches a predetermined value corresponding to a supported bridge device.

In an embodiment of a method for identifying bridge devices, a standard command is generated and transmitted to a bridge device, and output information corresponding to the standard command is received from the bridge device. The bridge device is identified by determining whether a predetermined value of at least one no-available parameter in the output information matches a predefined value for a supported bridge device.

In an embodiment of a method for identifying bridge devices, a standard command comprising at least one no-available parameter is received by a bridge device. In response to the standard command, output information comprising at least one no-available parameter is generated. The bridge device sets the no-available parameter in the output information as a predetermined value if the no-available parameter in the standard command matches a predefined value. The bridge device is identified according to the output information.

An embodiment of a system for identifying bridge devices comprises a bridge device. The bridge device receives a standard command comprising at least one no-available parameter, and records a value of the no-available parameter in the standard command. The bridge device sets at least one no-available parameter in output information corresponding to the standard command if the no-available parameter in the standard command matches a predefined value. The bridge device is identified according to the output information.

Methods for identifying bridge devices and systems thereof may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein:

FIG. 2A is a schematic diagram illustrating an embodiment of an IDLE standard command for ATA/ATAPI;

FIG. 2B is a schematic diagram illustrating an embodiment of an IDLE standard command in frame information structure corresponding to FIG. 2A;

FIG. 3A is a schematic diagram illustrating an embodiment of output information corresponding to an IDLE standard command;

FIG. 3B is a schematic diagram illustrating an embodiment of output information corresponding to an IDLE standard command in frame information structure;

FIG. 4A is a schematic diagram illustrating an embodiment of an IDLE standard command;

FIG. 4B is a schematic diagram illustrating an embodiment of an IDLE standard command in frame information structure corresponding to FIG. 4A;

FIG. 5A is a schematic diagram illustrating an embodiment of an IDLE standard command;

FIG. 5B is a schematic diagram illustrating an embodiment of an IDLE standard command in frame information structure corresponding to FIG. 5A;

FIG. 6A is a schematic diagram illustrating an embodiment of an IDLE standard command;

FIG. 6B is a schematic diagram illustrating an embodiment of an IDLE standard command in frame information structure corresponding to FIG. 6A;

FIG. 7A is a schematic diagram illustrating an embodiment of output information set on no-available parameters;

FIG. 7B is a schematic diagram illustrating an embodiment of output information set on no-available parameters in frame information structure;

DETAILED DESCRIPTION OF THE INVENTION

Methods for identifying bridge devices and systems thereof are provided.

Figure 1:
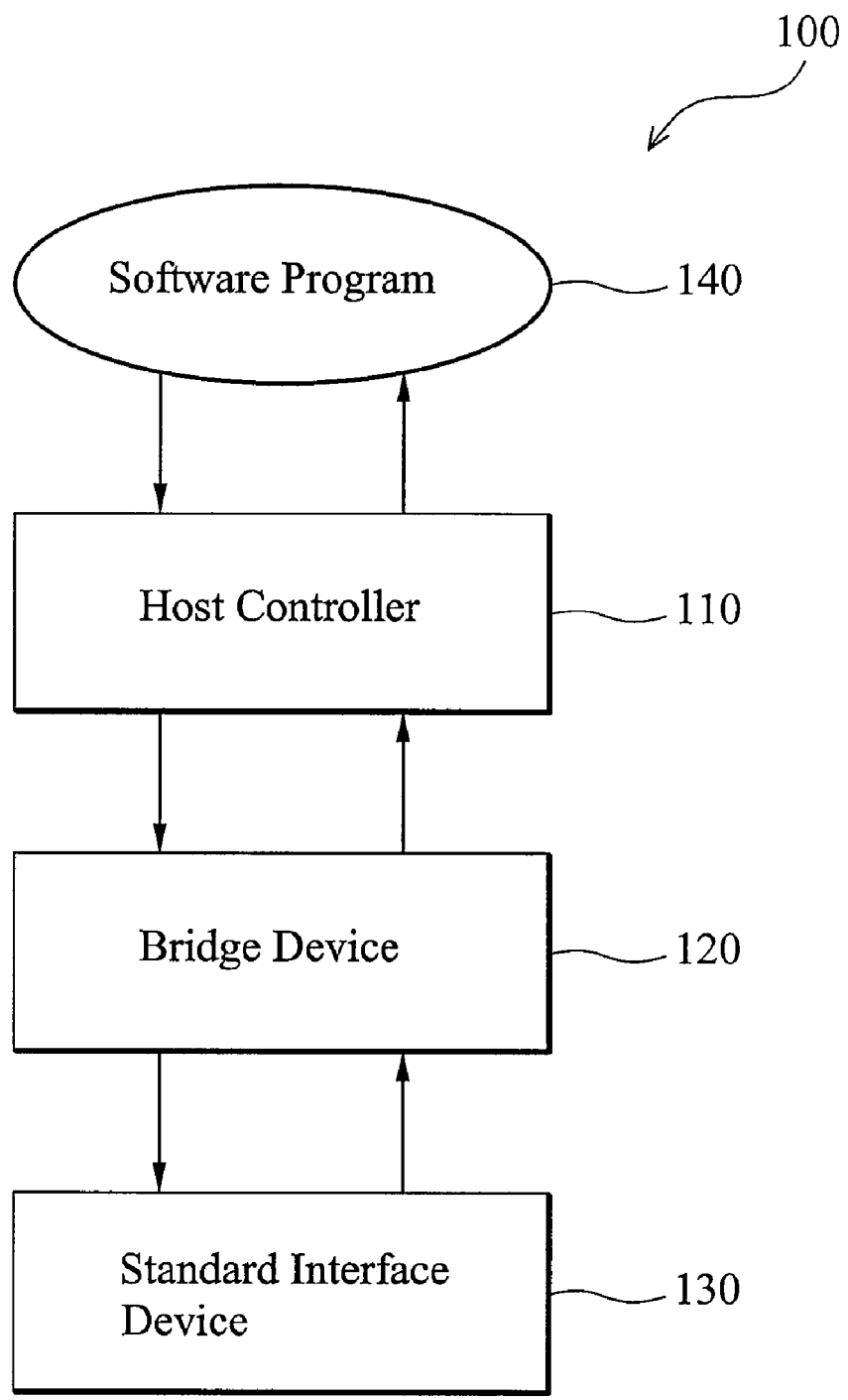
FIG. 1 is a schematic diagram illustrating an embodiment of a system for identifying bridge devices.

FIG. 1 is a schematic diagram illustrating an embodiment of a system for identifying bridge devices.

The system 100 may be a computer system comprising a host controller 110, a bridge device 120, and a standard interface device 130. The standard interface device 130 couples to the host controller 110 via the bridge device 120 via standard interfaces, such as ATA, ATAPI, and SATA interfaces. The bridge device 120 may be an ATA, ATAPI, or SATA bridge device. It is understood that since the SATA interface is expanded based on the ATA interface, the SATA interface conforms and accepts the commands and output information of the ATA interface. An application such as a software program 140 can generate and output commands to the host controller 110. In some embodiments, the application is used for testing the functionality of the bridge device 120 and/or the standard interface device 130. The bridge device 120 transmits data and transforms data format between the host controller 110 and the standard interface device 130. For example, the bridge device 120 transforms a command received from the host controller 110 into a format understood by the standard interface device 130, and transmits the transformed command to the standard interface device 130. It is noted that input parameters in the command are recorded in corresponding input and command registers in the standard interface device 130. The standard interface device 130 performs the command according to the input and command registers, generates output information, and transmits the output information to the bridge device 120. The bridge device 120 then transforms the output information into a format understood by the host controller 110, and transmits it to the host controller 110. Details of the bridge device 120 are discussed later.

FIG. 2A is a schematic diagram illustrating an embodiment of an IDLE standard command for ATA/ATAPI. As shown in FIG. 2A, the standard command comprises a plurality of input parameters comprising Features, Sector Count, LBA Low, LBA Mid, LBA High, Device, and Command register parameters. The Features, LBA Low, LBA Mid, and LBA High register parameters are no-available (na) input parameters in the standard command, and the corresponding values can be any value. Generally, the values of the na input parameters are generated randomly, and will not influence the execution of the standard interface 130. In the IDLE standard command, a Sector Count register corresponding to the Sector Count register parameter is set as the timer period value greater than 0. Bit 4 of a Device register corresponding to the Device register parameter is set as "DEV" according to the definition of the IDLE standard command, and Bit 5 and 7 of the Device register are obsolete (obs), and other bits of the Device register are na input parameters, being any value. A Command register corresponding to the Command register parameter stores a command code of the standard command, "E3h" in FIG. 2A, for example.

In some embodiments, the host controller 110 transforms the standard command in FIG. 2A into a frame information structure (FIS), as shown in FIG. 2B. That is the host controller 110 records the values of the Command, Features, Sector Count, LBA Low, LBA Mid, LBA High, and Device registers in Command, Features, Sector Count, LBA Low, LBA Mid, LBA High, and Device fields in FIG. 2B. It is noted that Features (exp), Sector Count (exp), LBA Low (exp), LBA Mid (exp), and LBA High (exp) fields in FIG. 2B support the expanded input parameters in 48-bit standard commands. The 48-bit standard commands support the standard interface device with 48-bit logic block addressing (LBA). The 29th to 48th bits of a 48-bit standard command are recorded to the registers corresponding to the expanded input parameters. It is understood that if a 28-bit standard command is provided, the expanded input parameters comprising Features (exp), Sector Count (exp), LBA Low (exp), LBA Mid (exp), and LBA High (exp) are na input parameters.

As described, output information is generated and recorded into a plurality of registers of the standard interface device 130 after a command is performed, and the status of the standard interface device 130 after performing the command can be determined accordingly. FIG. 3A is a schematic diagram illustrating an embodiment of output information corresponding to an IDLE standard command. As shown in FIG. 3A, the output information comprises a plurality of output parameters comprising Error, Sector Count, LBA Low, LBA Mid, LBA High, Device, and Status register parameters. The Error, Sector Count, LBA Low, LBA Mid, and LBA High register parameters are na output parameters in the output information corresponding to an IDLE standard command, and the standard interface device 130 can fill any value in corresponding registers. Additionally, Bit 4 of the Device register is set as "DEV" according to the definition of the IDLE standard command, and Bit 5 and 7 of the Device register are obsolete (obs), and other bits of the Device register are na output parameters, being any value. Bit 0, 3, 5, 6, and 7 of the Status register are set according to the IDLD standard command, and other bits of the Status register are na output parameters, being any value. In some embodiments, the bridge device 120 transforms the output information in FIG. 3A into the frame information structure, as shown in FIG. 3B. That is the bridge device 120 records the values of the output parameters in corresponding fields in FIG. 3B. The Sector Count (exp), LBA Low (exp), LBA Mid (exp), and LBA High (exp) fields in FIG. 3B record expanded output parameters after performing 48-bit standard commands. If a 28-bit standard command is performed to generate output information, the expanded output parameters are na output parameters.

Figure 8A:
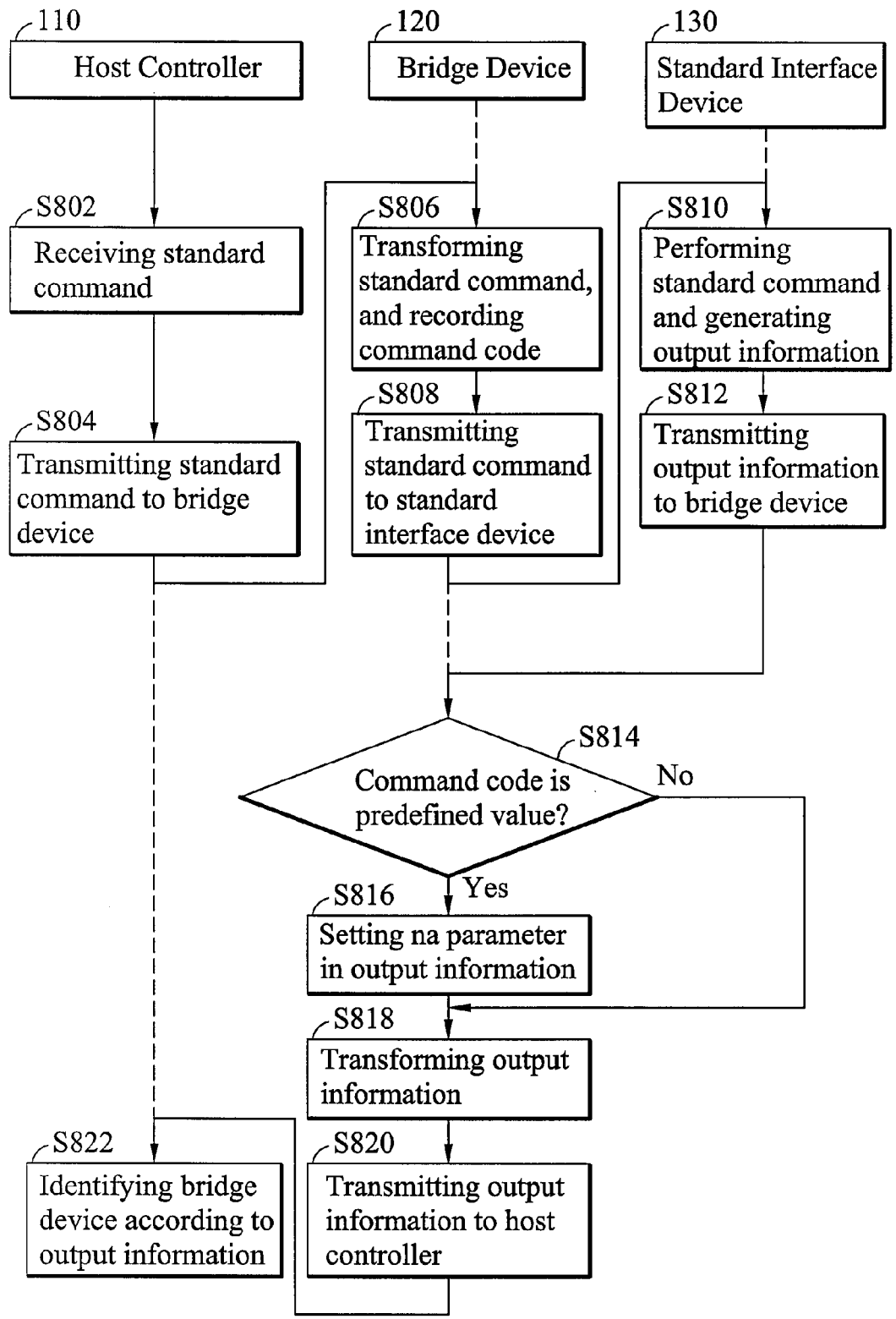
FIG. 8A is a flowchart of an embodiment of a method for identifying bridge devices.

FIG. 8A is a flowchart of an embodiment of a method for identifying bridge devices.

In step S802, the host controller 110 receives a standard command. It is understood that the standard command can be generated by an application such as the software program 140 based on ATA, ATAPI, or SATA standard, and can be recognized by the bridge device 120 and the standard interface device 130. The input parameters in the standard command are set as in FIG. 2A. In step S804, the host controller 110 transmits the standard command to the bridge device 120. In step S806, the bridge device 120 transforms the standard command into a format understood by the standard interface device 130, and records the command code ("E3h" in FIG. 2A) in the standard command. In step S808, the bridge device 120 transmits the transformed standard command to the standard interface device 130. In step S810, the standard interface device 130 performs the standard command according to the command code and input parameters in the standard command, and generates output information accordingly as shown in FIG. 3A. In step S812, the output information is transmitted to the bridge device 120. It is understood that the output parameters in the output information are also recorded in the corresponding registers.

After receiving the output information, in step S814, the bridge device 120 determines whether the command code recorded in step S806 is a predefined value. If not (No in step S814), the procedure goes to step S818. If so (Yes in step S814), in step S816, the bridge device 120 selects and sets the na parameters in the output information as predetermined values. FIG. 7A is a schematic diagram illustrating an embodiment of output information set on no-available parameters. As shown in FIG. 7A, the na parameters in the output information comprise Sector Count, LBA Low, LBA Mid, and LBA High register parameters. In this embodiment, the bridge device 120 sets the Sector Count, LBA Low, LBA Mid, and LBA High register parameters as "01h", "02h", "03h", and "04h", respectively. It is understood that the selected na parameters for setting, and the corresponding predetermined values are examples, although the disclosure is not limited thereto. After setting the na parameters in the output information, in step S818, the bridge device 120 transforms the output information into a format understood by the host controller 110, and in step S820, transmits the output information to the host controller 110. In step S822, the host controller 110 identifies the bridge device 120 according to the output information. Additionally, the software program 140 can read the output information from the host controller 110 and identify the bridge device 120 accordingly. It is noted that the predetermined values of the Sector Count, LBA Low, LBA Mid, and LBA High register parameters corresponding to the bridge device 120 are provided in the host controller 110 and/or the software program 140. Identification of the bridge device comprises determination of whether the value of the no-available parameter matches the predetermined value corresponding to the bridge device. If the Sector Count, LBA Low, LBA Mid, and LBA High register parameters in the output information are "01h", "02h", "03h", and "04h", respectively, the bridge device 120 is a supported device. In one case, the software program 140 can continue subsequent bridge device testing. If the Sector Count, LBA Low, LBA Mid, and LBA High register parameters in the output information are not "01h", "02h", "03h", and "04h", respectively, the bridge device 120 is not a supported device, and the software program 140 terminates.

In this embodiment, the bridge device 120 has a predefined value of the command code ("E3h" in this embodiment) to determine whether to set na parameters in the output information, and predetermined values for setting the na parameters if the command code in the received standard command matches the predefined value. The software program 140 and/or the host controller 110 can determine whether the na parameters in the received output information have the same predetermined values corresponding to the bridge device, thereby identifying the bridge device.

Figure 8B:
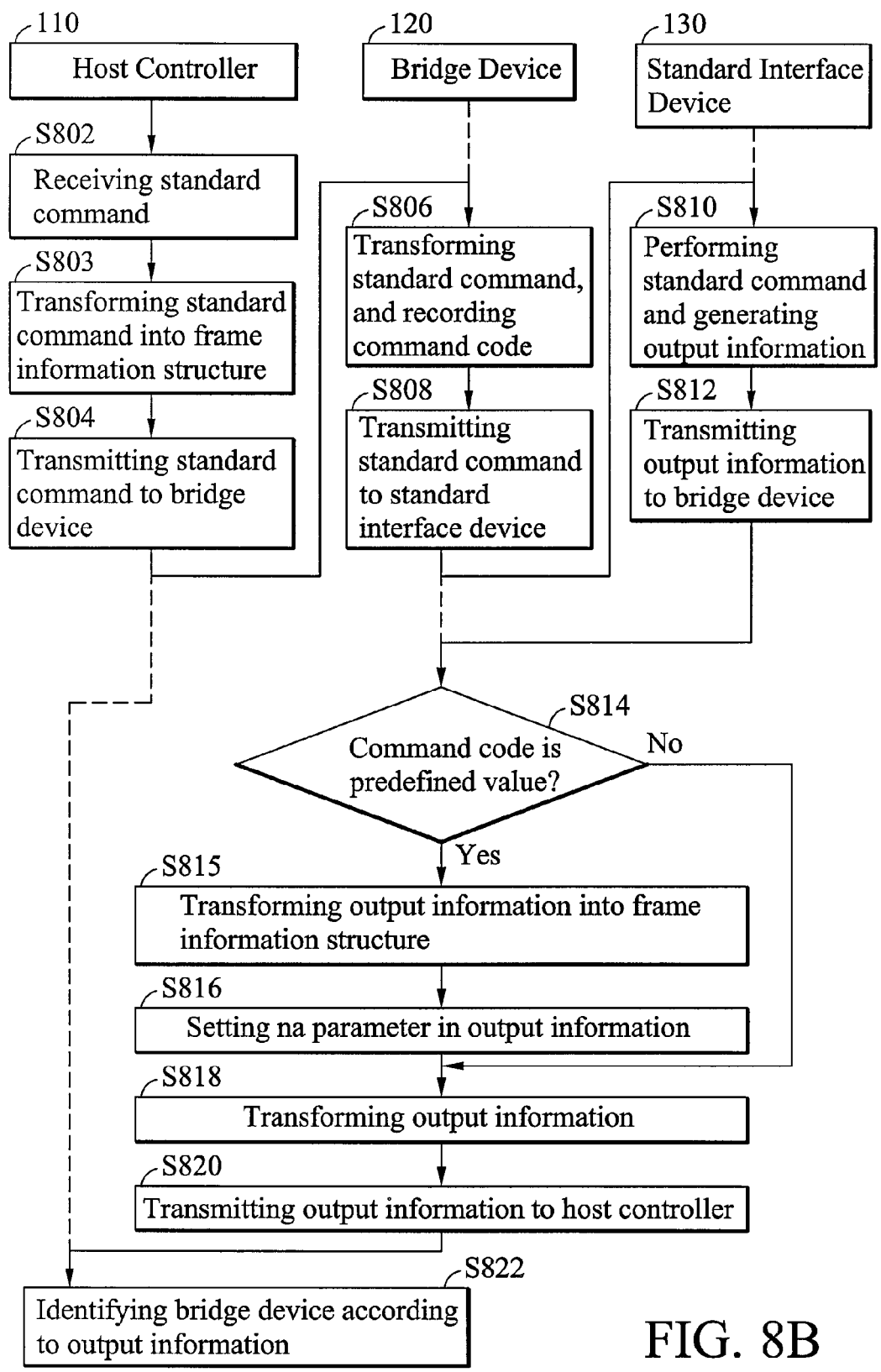
FIG. 8B is a flowchart of an embodiment of a method for identifying bridge devices capable with commands and output information in frame information structure.

As described, the standard command and output information may be in the frame information structure. In some embodiments, before the standard command is transmitted to the bridge device 120, the host controller 110 transforms the standard command in FIG. 2A into the frame information structure in FIG. 2B in step S803 of FIG. 8B. Additionally, before the na parameters are set, the bridge device 120 transforms the output information in FIG. 3A into the frame information structure in FIG. 3B in step S815 of FIG. 8B. The output information set on no-available parameters in frame information structure is shown in FIG. 7B. In this example, the na parameters in the output information comprise Sector Count (exp), LBA Low (exp), LBA Mid (exp), and LBA High (exp) register parameters. In this embodiment, the bridge device 120 sets the Sector Count (exp), LBA Low (exp), LBA Mid (exp), and LBA High (exp) register parameters as "01h", "02h", "03h", and "04h", respectively. Similarly, the selected na parameters for setting, and the corresponding predetermined values are examples, although the disclosure is not limited thereto. If the Sector Count (exp), LBA Low (exp), LBA Mid (exp), and LBA High (exp) register parameters in the output information are "01h", "02h", "03h", and "04h", respectively, the bridge device 120 is a supported device, and if not, the bridge device 120 is not a supported device.

Figure 9A:
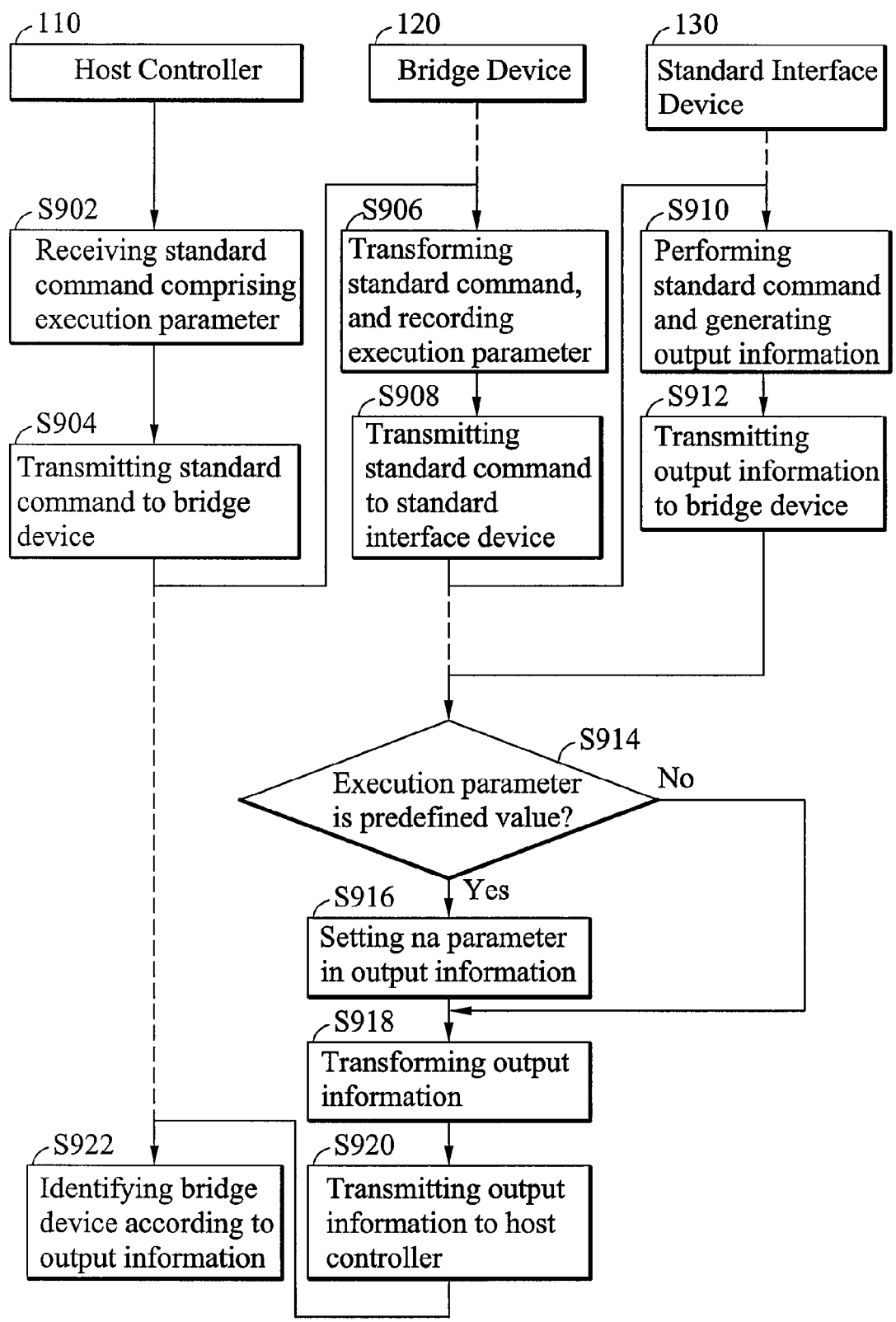
FIG. 9A is a flowchart of an embodiment of a method for identifying bridge devices.

FIG. 9A is a flowchart of an embodiment of a method for identifying bridge devices.

In step S902, the host controller 110 receives a standard command. It is understood that the standard command can be generated by an application such as the software program 140. The input parameters in the standard command are set as in FIG. 4A, where the LBA High register parameter is selected as an execution parameter and set as "06h". In step S904, the host controller 110 transmits the standard command to the bridge device 120. In step S906, the bridge device 120 transforms the standard command into a format understood by the standard interface device 130, and records the execution parameter ("06h" in FIG. 4A) in the standard command. In step S908, the bridge device 120 transmits the transformed standard command to the standard interface device 130. In step S910, the standard interface device 130 performs the standard command according to the command code and input parameters in the standard command, and generates output information accordingly as shown in FIG. 3A. In step S912, the output information is transmitted to the bridge device 120. It is understood that the output parameters in the output information are also recorded in the corresponding registers.

After receiving the output information, in step S914, the bridge device 120 determines whether the execution parameter recorded in step S906 is a predefined value. If not (No in step S914), the procedure goes to step S918. If so (Yes in step S914), in step S916, the bridge device 120 selects and sets the na parameters in the output information as predetermined values, as shown in FIG. 7A. After setting the na parameters in the output information, in step S918, the bridge device 120 transforms the output information into a format understood by the host controller 110, and in step S920, transmits the output information to the host controller 110. In step S922, the host controller 110 identifies the bridge device 120 according to the output information. Additionally, the software program 140 can read the output information from the host controller 110 and identify the bridge device 120 accordingly. In this embodiment, the bridge device 120 has a predefined value of the execution parameter ("06h" in this embodiment) for determining whether to set na parameters in the output information, and predetermined values for setting the na parameters if the execution parameter in the received standard command matches the predefined value.

Figure 9B:
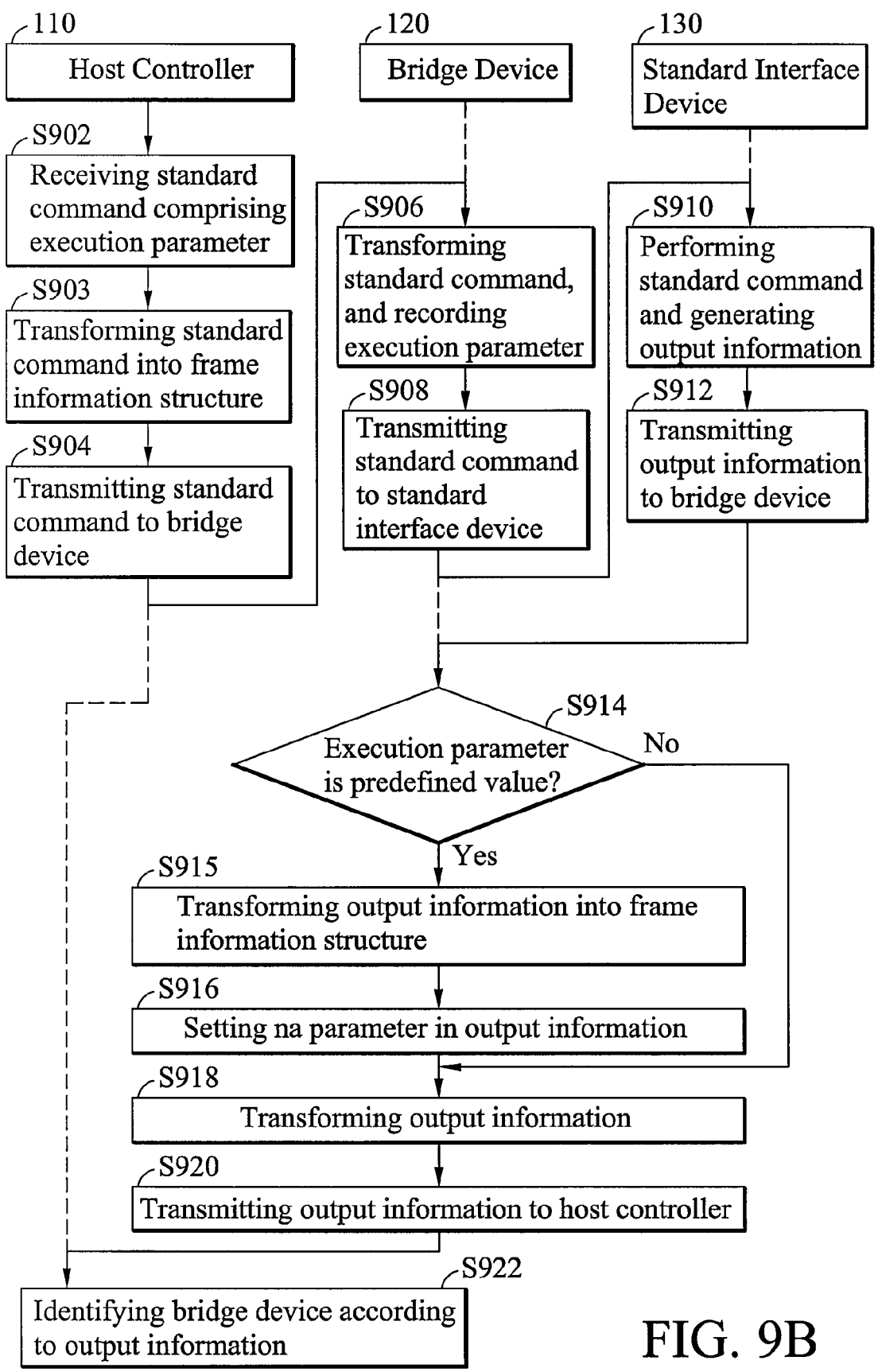
FIG. 9B is a flowchart of an embodiment of a method for identifying bridge devices with commands and output information in frame information structure.

Similarly, the standard command and output information may be in the frame information structure. In some embodiments, before the standard command is transmitted to the bridge device 120, the host controller 110 transforms the standard command in FIG. 4A into the frame information structure in FIG. 4B in step S903 of FIG. 9B. Additionally, before the na parameters are set, the bridge device 120 transforms the output information in FIG. 3A into the frame information structure in FIG. 3B in step S915 of FIG. 9B. The output information set on no-available parameters in frame information structure is shown in FIG. 7B.

Figure 10A:
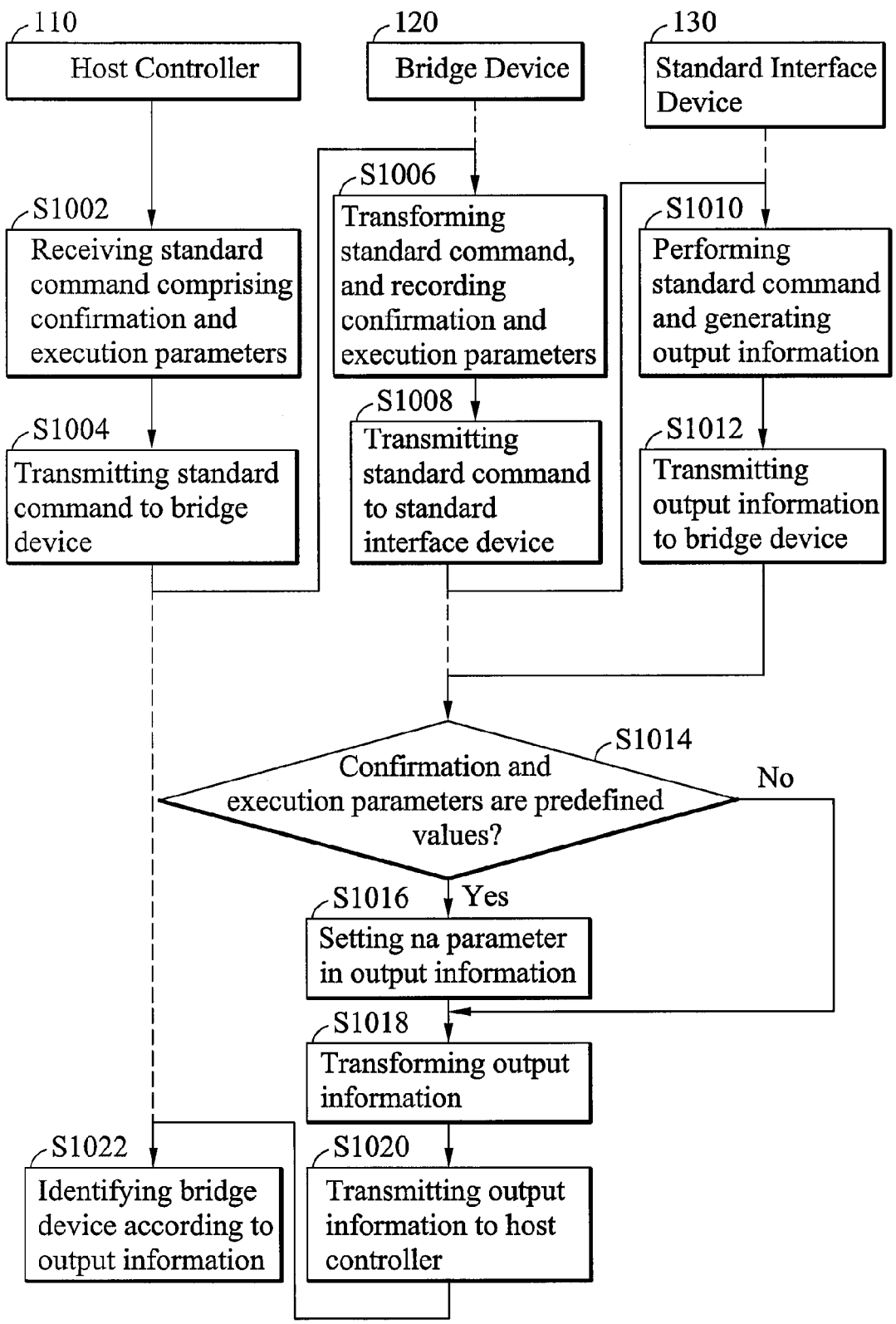
FIG. 10A is a flowchart of an embodiment of a method for identifying bridge devices.

FIG. 10A is a flowchart of an embodiment of a method for identifying bridge devices.

In step S1002, the host controller 110 receives a standard command. It is understood that the standard command can be generated by an application such as the software program 140. The input parameters in the standard command are set as in FIG. 5A, where the LBA High register parameter is selected as an execution parameter and set as "06h", and LBA Low and LBA Mid register parameters are selected as confirmation parameters and set as "07h" and "08h", respectively. In step S1004, the host controller 110 transmits the standard command to the bridge device 120. In step S1006, the bridge device 120 transforms the standard command into a format understood by the standard interface device 130, and records the execution parameter ("06h" in FIG. 5A) and confirmation parameters ("07h" and "08h" in FIG. 5A) in the standard command. In step S1008, the bridge device 120 transmits the transformed standard command to the standard interface device 130. In step S1010, the standard interface device 130 performs the standard command according to the command code and input parameters in the standard command, and generates output information accordingly as shown in FIG. 3A. In step S1012, the output information is transmitted to the bridge device 120. It is understood that the output parameters in the output information are also recorded in the corresponding registers.

After receiving the output information, in step S1014, the bridge device 120 determines whether the confirmation parameters and execution parameter recorded in step S1006 are predefined values. If not (No in step S1014), the procedure goes to step S1018. If so (Yes in step S1014), in step S1016, the bridge device 120 selects and sets the na parameters in the output information as predetermined values, as shown in FIG. 7A. After setting the na parameters in the output information, in step S1018, the bridge device 120 transforms the output information into a format understood by the host controller 110, and in step S1020, transmits the output information to the host controller 110. In step S1022, the host controller 110 identifies the bridge device 120 according to the output information. Additionally, the software program 140 can read the output information from the host controller 110 and identify the bridge device 120 accordingly. In this embodiment, the bridge device 120 has predefined values of the confirmation and execution parameters ("07h" and "08h" for the confirmation parameters, and "06h" for the execution parameter in this embodiment) for determining whether to set na parameters in the output information, and predetermined values for setting the na parameters if the confirmation and execution parameters in the received standard command respectively match the predefined values.

Figure 10B:
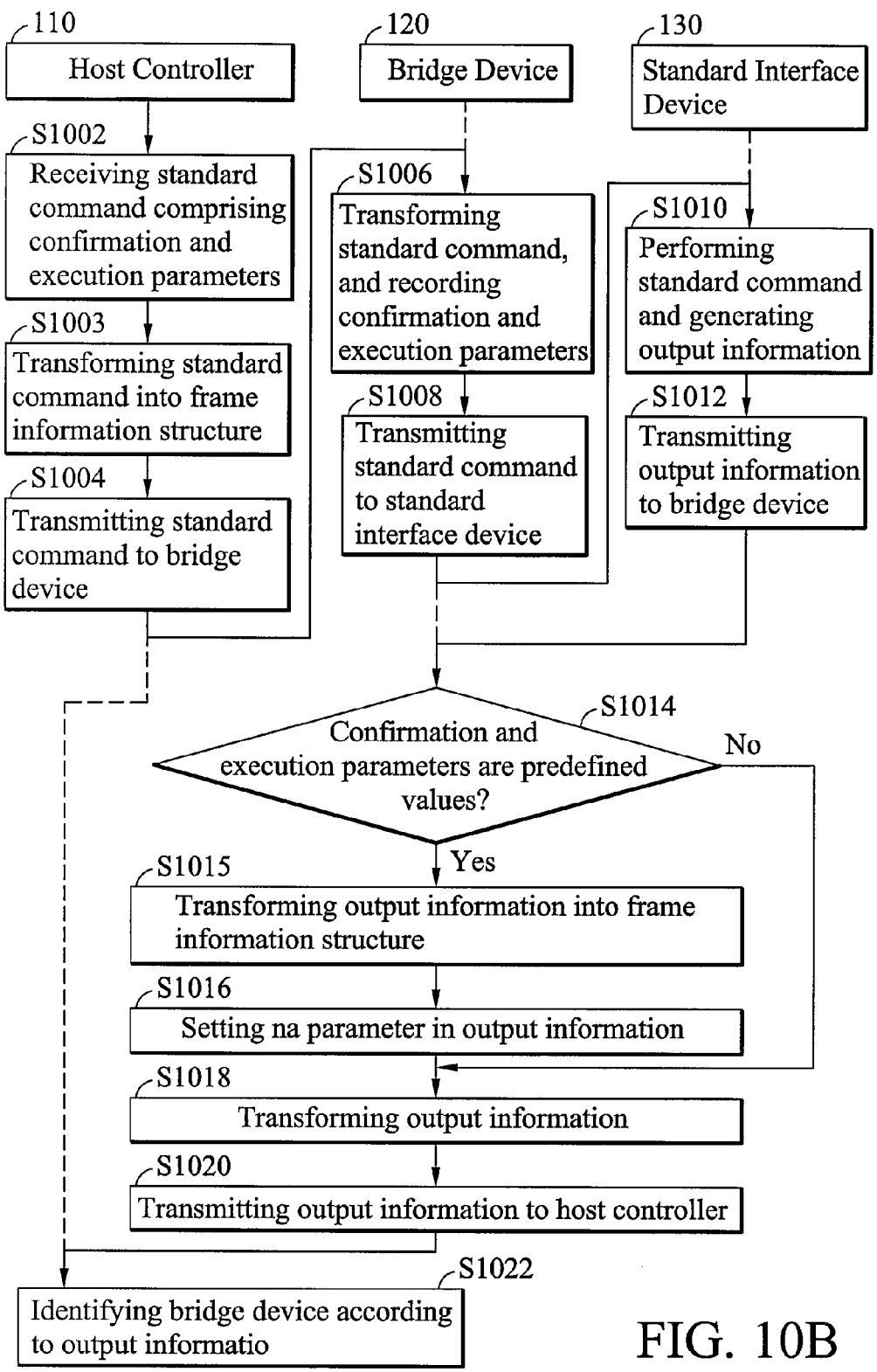
FIG. 10B is a flowchart of an embodiment of a method for identifying bridge devices with commands and output information in frame information structure.

Similarly, the standard command and output information may be in the frame information structure. In some embodiments, before the standard command is transmitted to the bridge device 120, the host controller 110 transforms the standard command in FIG. 5A into the frame information structure in FIG. 5B in step S1003 of FIG. 10B. Additionally, before the na parameters are set, the bridge device 120 transforms the output information in FIG. 3A into the frame information structure in FIG. 3B in step S1015 of FIG. 10B. The output information set on no-available parameters in frame information structure is shown in FIG. 7B.

In some embodiments, the confirmation parameters and the execution parameter can be respectively set in two standard commands, and transmitted to the bridge device 120. For example, a first standard command with the confirmation parameter setting can be first transmitted to the bridge device 120. The bridge device 120 records the confirmation parameters and transmits the transformed standard command to the standard interface device 130 for execution. At this time, the bridge device 120 transmits the transformed output information without na parameter setting to the host controller 110. Thereafter, a second standard command with the execution parameter setting is transmitted to the bridge device 120. The bridge device 120 records the execution parameter and transmits the transformed standard command to the standard interface device 130 for execution. Since the bridge device 120 has recorded the confirmation and execution parameters, the bridge device 120 determines whether to set na parameters in the output information, and sets them correspondingly if the recorded confirmation and execution parameters match respective predefined values.

Methods for identifying bridge devices and systems thereof, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for identifying bridge devices, comprising:
receiving a standard command comprising a command code by a bridge device from a host controller, wherein the standard command is recognized and defined to the bridge device;

transmitting the standard command to a standard interface device by the bridge device;

performing the standard command by the standard interface to generate output information comprising at least one no-available parameter in response to the standard command, wherein the no-available parameter has an any value, and transmitting the output information to the bridge device by the standard interface device;

determining whether the command code matches a predefined value by the bridge device;

setting the at least one no-available parameter from the any value to a specific value by the bridge device if the command code matches the predefined value;

transmitting the output information that has been set by the bridge device to the host controller by the bridge device;

identifying the bridge device by the host controller or an application according to the output information that has been set by the bridge device by determining whether the specific value of the no-available parameter matches a predetermined value of a specific supported bridge device.

2. The method of claim 1 further comprising:

transforming the output information by the bridge device into a format understood by the host controller, and transmitting the transformed output information to the host controller.

3. The method of claim 1 further comprising terminating if the specific value of the no-available parameter does not match the predetermined value corresponding to the supported bridge device.

4. The method of claim 1 wherein the no-available parameter comprises Sector Count, LBA Low, LBA Mid, or LBA High register parameter.

5. The method of claim 1 further comprising transforming the standard command by the host controller into a frame information structure, and transmitting the transformed standard command to the bridge device.

6. The method of claim 5 further comprising transforming the output information by the bridge device into the frame information structure before setting the no-available parameter.

7. A system for identifying bridge devices, comprising:

a standard interface device;

a host controller transmitting a standard command comprising a command code; and a bridge device receiving the standard command from the host controller, wherein the standard command is recognized and defined to the bridge device, recording a command code therein, transmitting the standard command to the standard interface device by the bridge device, and receiving output information from the standard interface device, wherein the standard interface device performs the standard command to generate the output information and the output information comprises at least one no-available parameter, and the no-available parameter has an any value, determining whether the command code matches a predefined value, and setting the at least one no-available parameter from the any value to a specific value in the output information if the command code matches the predefined value, and transmitting the output information that has been set by the bridge device to the host controller, wherein the host controller or an application identifies the bridge device according to the output information by determining whether the specific value of the no-available parameter matches a predetermined value of a specific supported bridge device.

8. The system of claim 7 wherein the bridge device further transforms the output information into a format understood by the host controller, and transmits the transformed output information to the host controller.

9. The system of claim 7 further comprising the application terminating if the specific value of the no-available parameter does not match the predetermined value corresponding to the supported bridge device.

10. The system of claim 7 wherein the no-available parameter comprises Sector Count, LBA Low, LBA Mid, or LBA High register parameter.

11. The system of claim 7 wherein the host controller further transforms the standard command into a frame information structure, and transmits the transformed standard command to the bridge device.

12. The system of claim 11 wherein the bridge device further transforms the output information into the frame information structure before setting the no-available parameter.

13. The system of claim 7 wherein the specific parameter is the execution parameter.

14. The system of claim 7 wherein the specific parameter are the execution parameter and confirmation parameters.

* * * * *